(12) United States Patent
Gillette et al.

(10) Patent No.: US 12,703,286 B2
(45) Date of Patent: Aug. 11, 2026

(54) PORTABLE COOKING APPARATUS

(71) Applicant: Rivian IP Holdings, LLC, Plymouth, MI (US)

(72) Inventors: Stephen Gillette, Worthing (GB); Michal Holcer, Mission Viejo, CA (US)

(73) Assignee: Rivian IP Holdings, LLC, Palo Alto, CA (US)

( * ) Notice: Subject to any disclaimer, the term of this patent is extended or adjusted under 35 U.S.C. 154(b) by 893 days.

(21) Appl. No.: 17/965,567

(22) Filed: Oct. 13, 2022

(65) Prior Publication Data

US 2024/0123888 A1 Apr. 18, 2024

(51) Int. Cl.
*B60N 3/16* (2006.01)
*F24C 15/30* (2006.01)
*H05B 6/12* (2006.01)

(52) U.S. Cl.
CPC ................ *B60N 3/16* (2013.01); *F24C 15/30* (2013.01); *H05B 6/1209* (2013.01)

(58) Field of Classification Search
CPC .......... B60N 3/16; F24C 15/30; H05B 6/1209
See application file for complete search history.

(56) References Cited

U.S. PATENT DOCUMENTS 5,730,282 A * 3/1998 Bureau .................. A45C 11/20 312/258
6,227,594 B1 * 5/2001 Pommeret ................ B60J 5/107 296/57.1
6,254,160 B1 7/2001 Marriott et al.
6,672,637 B2 1/2004 Hutzel
7,407,210 B2 8/2008 Arbaugh et al.
(Continued)

FOREIGN PATENT DOCUMENTS

CN 202283205 U * 6/2012
CN 108973837 A 12/2018
(Continued)

OTHER PUBLICATIONS

"Camp Chef Pro Series Deluxe 3-Burner Camp Stove", Bass Pro Shops, Retrieved from Internet URL : https://www.basspro.com/shop/en/camp-chef-pro-series-deluxe-3-burner-camp-stove, accessed on Dec. 14, 2022, pp. 21.
(Continued)

*Primary Examiner* — Thien S Tran
(74) *Attorney, Agent, or Firm* — Patterson + Sheridan, LLP

(57) ABSTRACT

A cooking apparatus includes a center section having a first longitudinal side opposite a second longitudinal side and a first lateral side opposite a second lateral side. The center section includes a cooktop and is hingedly coupled to a first leaf foldable at the first longitudinal side of the center section and a second leaf foldable at the second longitudinal side of the center section. The first leaf and the second leaf are foldable to allow the cooking apparatus to be stowed in a vehicle. The cooking apparatus comprises a cooking apparatus engagement point that mates with a vehicle engagement point to secure the cooking apparatus to a location on the vehicle where it can be used. The cooking apparatus further comprises a strap to aid in its portability, along with storage units that can house utensils and other commonly used cookware.

19 Claims, 11 Drawing Sheets

(56) References Cited

U.S. PATENT DOCUMENTS

| | | | | |
|---|---|---|---|---|
| 8,919,850 | B2 | 12/2014 | Quattrocolo et al. | |
| 10,183,608 | B2 | 1/2019 | Knight | |
| 10,214,131 | B2 | 2/2019 | Aplin | |
| 10,899,282 | B2 | 1/2021 | Aplin | |
| 11,230,218 | B2 | 1/2022 | Chevalier et al. | |
| 11,345,287 | B2 | 5/2022 | Aldrich et al. | |
| 2006/0197352 | A1* | 9/2006 | Bassett | B60R 11/06 296/37.6 |
| 2020/0100622 | A1* | 4/2020 | Collins | H01M 10/655 |
| 2020/0263876 | A1* | 8/2020 | Gross | F24C 3/14 |
| 2020/0361360 | A1 | 11/2020 | Parker et al. | |

FOREIGN PATENT DOCUMENTS

| | | | | |
|---|---|---|---|---|
| CN | 208566759 | U | * | 3/2019 |
| CN | 209595559 | U | * | 11/2019 |
| DE | 86 27 974 | U1 | | 2/1987 |
| DE | 86 33 925 | U1 | | 2/1987 |
| DE | 10 2016 200 198 | A1 | | 7/2017 |
| FR | 2 632 583 | A1 | | 12/1989 |
| WO | 2018/234979 | A1 | | 12/2018 |

OTHER PUBLICATIONS

“GCI Slim-Fold Cook Station—Black”, Sportsman’s Warehouse, Retrieved from Internet URL : https://www.sportsmans.com/camping-gear-supplies/camp-furniture/chairs-seats-loungers/gci-slim-fold-cook-station/p/1403800, accessed on Dec. 14, 2022, pp. 3.

“GSI Outdoors Selkirk 460 Camp Stove—Hike & Camp”, Retrieved from Internet URL : https://www.backcountry.com/gsi-outdoors-selkirk-460-camp-stove, accessed on Dec. 14, 2022, pp. 3.

Annis, R., “Scout Overland Kitchen”, Retrieved from Internet URL : https://web.archive.org/web/20161021102736/https://www.outsideonline.com/2099751/scout-overland-kitchen, pp. 4 (Jul. 29, 2016).

Roberts, I. L., “Cooking in your camper with boot jump 2020 and Primus equipment”, Amdro Alternative Campervans, Retrieved from Internet URL : www.amdro.co.uk/cooking-in-your-camper-with-boot-jump-2020-and-primus-equipment/ , accessed on Dec. 14, 2022, pp. 9 (Dec. 12, 2019).

* cited by examiner

300

302

TRANSITION A COOKING APPARATUS FROM AN OPEN CONFIGURATION TO A CLOSED CONFIGURATION

304

NEST THE COOKING APPARATUS, IN THE CLOSED CONFIGURATION, WITHIN A STORAGE COMPARTMENT OF A VEHICLE, THE STORAGE COMPARTMENT COMPRISING A STORAGE COMPARTMENT PROFILE CORRESPONDING A PROFILE OF THE COOKING APPARATUS IN THE CLOSED CONFIGURATION

PORTABLE COOKING APPARATUS

Some conventional vehicles, such as recreational vehicles (RVs) have cooking systems. Many of these systems are constructed as a fixed part of a vehicle and are not portable.

SUMMARY

The present technology provides for a portable cooking apparatus that can be stowed in a vehicle. The cooking apparatus has a center section, a first leaf, and a second leaf. The first leaf is hingedly coupled to the center section at a first longitudinal side, and the second leaf is hingedly coupled to the center section at a second longitudinal side. Each leaf is foldable onto a center section top aspect to reduce the profile of the cooking apparatus and make it easier to stow and carry.

The cooking apparatus can also include various storage units that provide storage for cooking utensils and other items. One such example includes a storage unit that is coupled to a back aspect of the center section. This storage unit can comprise an open area for storing items or stowing a retractable cord to provide the cooking apparatus with an electrical connection. Another storage unit is in the form of a drawer that is accessible at a front aspect of the cooking apparatus (e.g. a front aspect of the center section). To further aid in portability, aspects of the cooking apparatus comprises a strap, which can allow the cooking apparatus to be easily carried, while also serving to secure the cooking apparatus within the vehicle by, for instance, securing the strap around a headrest.

Moreover, the cooking apparatus is usable in coordination with a vehicle. The vehicle comprises a storage compartment that has a storage compartment profile substantially equal to a cooking apparatus profile when the cooking apparatus is in a closed configuration with the leaves folded onto the center section. As such, the cooking apparatus nests within the storage compartment, thereby allowing vehicle space to be efficiently used, even when transporting the camp kitchen.

This summary is intended to introduce a selection of concepts in a simplified form that are further described below in the detailed description section of this disclosure. This summary is not intended to identify key or essential features of the claimed subject matter, nor is it intended to be an aid in determining the scope of the claimed subject matter. Additional objects, advantages, and novel features of the technology will be set forth in part in the description that follows, and in part will become apparent to those skilled in the art upon examination of the following or learned by practice of the technology.

BRIEF DESCRIPTION OF THE DRAWINGS

The present technology is described in detail below with reference to the attached drawing figures, wherein.

DETAILED DESCRIPTION

Figure 1:
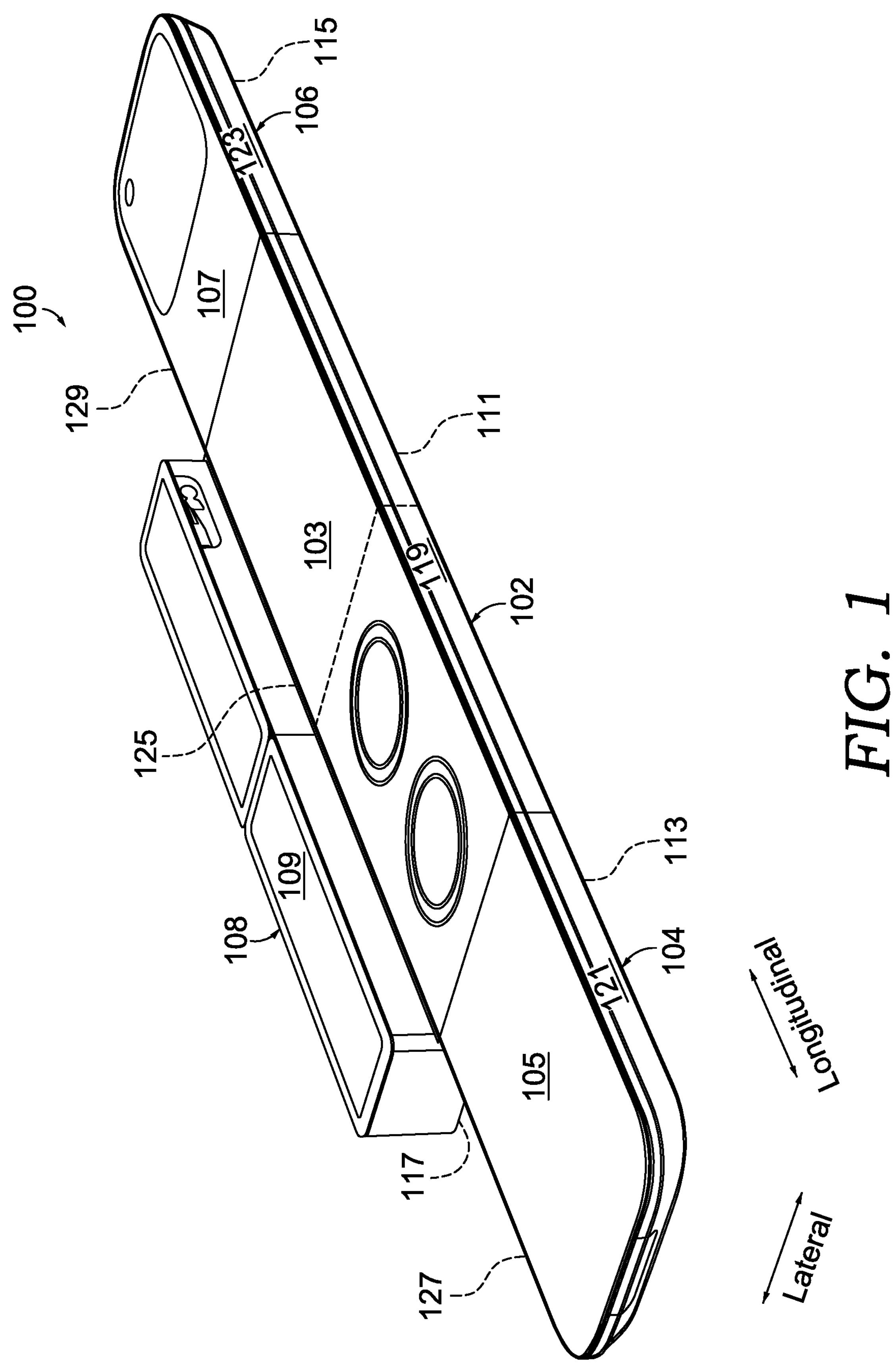
FIG. 1 illustrates an example cooking apparatus, in accordance with an aspect described herein.

A cooking system that is easily stored within a vehicle and easy to carry helps maximize the convenience of cooking when on the go. One example cooking apparatus comprises a center section that is coupled at a first longitudinal side to a first leaf and coupled at a second longitudinal side to a second leaf. The leaves are hingedly coupled so that they fold onto a center section top aspect, giving the cooking apparatus a closed configuration in which it can be easily stowed in a vehicle or carried.

The cooking apparatus may further comprise one or more storage units where items can be stowed for use when cooking. One such storage unit is located at a back aspect of the cooking apparatus and extends laterally away from the center section. While portions of this unit may stow everyday cooking accessories, the storage unit can also house a retractable cable that facilitates powering an induction cooktop on the center section. Other storage units, such as drawers and bins, can be located at any position, such as a drawer accessible at a front aspect of the center section and a bin positioned on one of the leaves and assessable at a top aspect of the first or second leaf.

A bottom aspect of the center section can comprise one or more cooking apparatus engagement points, which include locations of the cooking apparatus that mate to vehicle engagement points. This helps to stabilize the cooking apparatus when in use at a location on the vehicle.

Portability of the cooking apparatus is enhanced through its compact profile, particularly when the cooking apparatus is in a closed configuration provided by folding the leaves onto the center section. The cooking apparatus profile substantially corresponds to a storage compartment profile of a storage compartment in the vehicle. This allows the cooking apparatus to be folded up and placed into the storage compartment, thereby allowing other storage areas of the vehicle to be used. Moreover, the cooking apparatus can be easily carried by way of a strap coupled at longitudinal ends of the center section. The strap may be sized to carry by hand, like a case, or may be sized to fit over or across a person's shoulder. The versatility of such a system allows it to be easily transported by the vehicle or physically moved to any location, thereby maximizing its utility in various locations and conditions.

The aforementioned embodiments have been provided as examples of the technology that may be practiced from the present disclosure. They are intended to be examples and are provided to aid in understanding the technology and its benefits. Additional features and embodiments are further described with reference to the figures.

Moreover, throughout this disclosure, the relative terms "top aspect," "bottom aspect," "front aspect," and "back aspect" are used. These terms are intended to describe features of a cooking apparatus when the cooking apparatus is in an as-used position. One of ordinary skill in the art will appreciate and have an understanding of the terms when the cooking apparatus is in this position.

FIG. 1 illustrates example cooking apparatus 100. Cooking apparatus 100 is intended to provide one illustrative aspect of the technology. However, it should be understood that other aspects, comprising additional or fewer components, in various arrangements, are intended to be within the scope of this disclosure.

In the example illustrated, cooking apparatus 100 comprises center section 102. Cooking apparatus 100 further comprises first leaf 104 and second leaf 106, which are each coupled to center section 102 at respective longitudinal sides. FIG. 1 illustrates cooking apparatus 100 in an open configuration, where each of first leaf 104 and second leaf 106 have been unfolded so that respective surfaces of the top aspects (103, 105, 107) of center section 102, first leaf 104, and second leaf 106 are co-planar, meaning that each of the respective surfaces extend substantially along a same theoretical plane. Said differently, in the open configuration, center section 102 is disposed between first leaf 104 and second leaf 106. In this configuration, the surfaces on the top aspects (103, 105, 107) of center section 102, first leaf 104, and second leaf 106 provide a cooking surface that can be used to cook and prepare food items. First leaf 104 and second leaf 106 are foldable onto center section 102 to transition cooking apparatus 100 from the open configuration illustrated in FIG. 1 to a closed configuration, which will be further discussed. That is, in general, first leaf 104 and second leaf 106 can be moved into a position onto center section 102. Thus, by foldable, it is meant that first leaf 104 and second leaf 106 are generally moveable, in any manner, about center section 102 so that they can be positioned onto center section 102. The top aspects (103, 105, 107) of center section 102, first leaf 104, and second leaf 106 are respectively opposite bottom aspects (111, 113, 115) of center section 102, first leaf 104, and second leaf 106.

In the example illustrated, cooking apparatus 100 comprises a front aspect comprising a front aspect (119, 121, 123) of center section 102, first leaf 104, and second leaf 106. This is opposite a back aspect of cooking apparatus 100 that comprises a back aspect (125, 127, 129) of center section 102, first leaf 104, and second leaf 106.

Some aspects, such as the one illustrated, further comprise storage unit 108. Storage unit 108 is illustrative of one or more storage units. Storage unit 108 extends laterally from at least a portion of center section 102. Storage unit 108 may be a separate component or integrally from a material of center section 102. Storage unit 108 provides a storage location where cooking utensils, food, or other like items may be stored for use with cooking apparatus 100. As will be further described, storage unit 108 may be used to house other items for use in operating cooking apparatus 100, such as a power cable, water tank, and the like. Some embodiments and features of storage unit 108 will be further described. Storage unit 108 comprises a top aspect 109 opposite a bottom aspect 117.

Figure 2A:
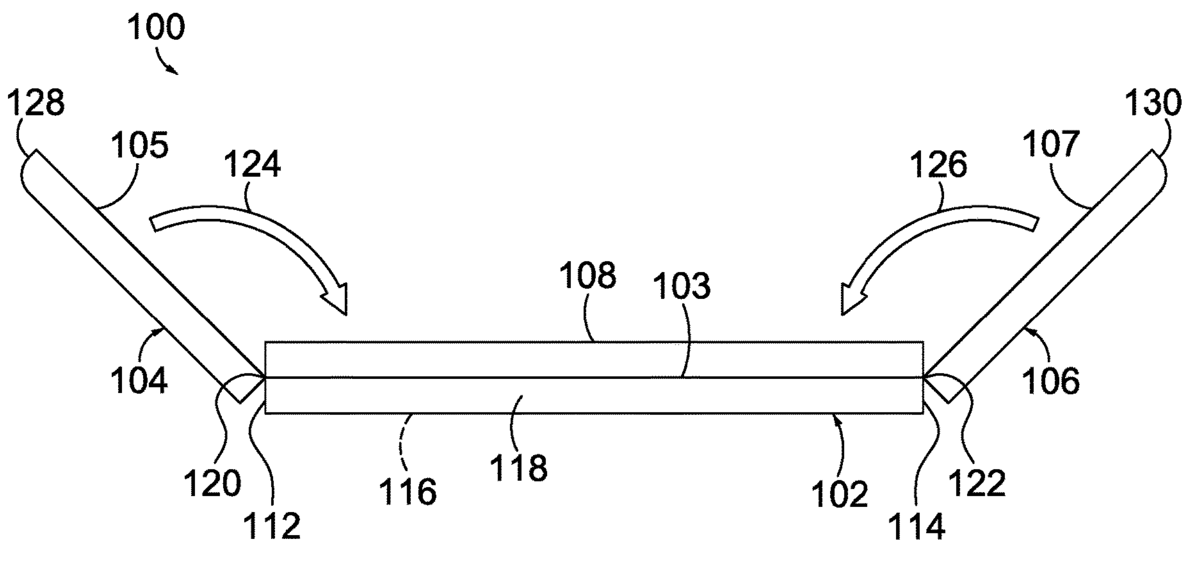
FIGS. 2A-2C illustrate various views of the cooking apparatus of FIG. 1 transitioning from an open configuration to a closed configuration, in accordance with aspects described herein.
Figure 2B:
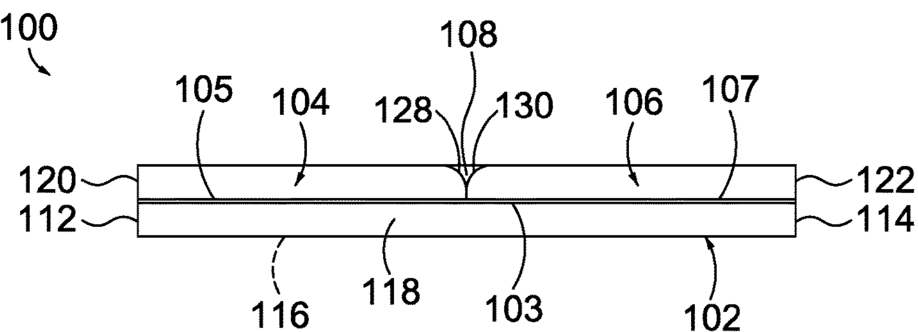
Figure 2C:
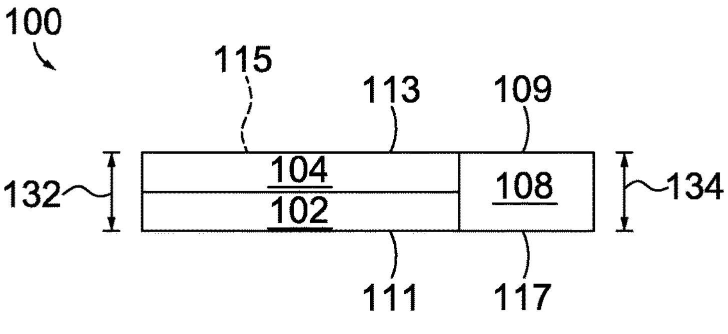

Referring now to FIGS. 2A-2C, various views of some configurations of cooking apparatus 100 of FIG. 1 are illustrated. As noted, aspects of cooking apparatus 100 provide for a portable system that can be folded into a closed configuration and stowed within a vehicle. FIGS. 2A-2C illustrate the transition between the open configuration and the closed configuration for an example aspect of the technology. FIGS. 2A-2B depict a front view of cooking apparatus 100 of FIG. 1, while FIG. 2C depicts a side view of cooking apparatus 100 of FIG. 1.

As illustrated by FIG. 2A, cooking apparatus 100 comprises center section 102. Center section 102 extends in a longitudinal direction from first longitudinal side 112 to second longitudinal side 114. Center section 102 also extends laterally from first lateral side 116 to second lateral side 118.

Center section 102 couples to first leaf 104 at first longitudinal side 112. Center section 102 couples to second leaf 106 at second longitudinal side 114. Center section 102 may be hingedly coupled to each of first leaf 104 and second leaf 106, such that first leaf 104 and second leaf 106 are each foldable about a hinge. As an example, center section 102 may be hingedly coupled to first leaf 104 by first hinge 120. Similarly, center section 102 may be hingedly coupled to second leaf 106 by second hinge 122.

It will be understood that various types of hinges may be used, and that the location of first hinge 120 and second hinge 122 are illustrative. For example, concealed hinges, butt hinges, piano hinges, barrel hinges, and so forth are some types that may be suitable for use. In general, the term "hinge" should be broadly understood to include any mechanism to allows first leaf 104 and second leaf 106 to be foldable about center section 102, and is intended to include a separate component or an integral part of center section 102, first leaf 104, or second leaf 106 that results in each of first leaf 104 and second leaf 106 being foldable about center section 102. For example, an area of center section 102 may be formed to hingedly couple to another area of first leaf 104 or second leaf 106 to cause first leaf 104 and second leaf 106 to be respectively foldable about center section 102.

As noted, in an open configuration, top aspects (103, 105, 107) center section 102, first leaf 104, and second leaf 106 may be substantially coplanar. FIG. 2A illustrates cooking apparatus 100 in the process of transitioning from the open configuration illustrated in FIG. 1 to the closed configuration illustrated in FIG. 2B. In the example illustrated, first leaf 104 folds about center section 102 in a direction indicated by directional arrow 124. Further, second leaf 106 folds about center section 102 in a direction indicated by directional arrow 126. In doing so, cooking apparatus 100 is transitioned to the closed configuration of FIG. 2B.

FIG. 2B illustrates one example closed configuration for cooking apparatus 100. As will be understood, other cooking apparatus aspects may have different arrangements when in an open or closed configuration. As such, FIG. 2B is intended to be one example in which the aspect illustrated by cooking apparatus 100 is arranged into the closed configuration.

In the closed configuration example of FIG. 2B, first leaf 104 has been transitioned to a position such that a top aspect 105 of first leaf 104 is proximate at least a portion of a top aspect 103 of center section 102. Second leaf 106 has been transitioned to a position such that a top aspect 107 of second leaf 106 is proximate at least a portion of a top aspect 103 of center section 102. That is, the first leaf top aspect 105 and the second leaf top aspect 107 each face the center section top aspect 103 in the closed configuration.

Put another way, first leaf 104 is coupled to center section 102 and extends therefrom to first leaf longitudinal end 128. Second leaf 106 is coupled to center section 102 and extends therefrom to second leaf longitudinal end 130. In the closed configuration, first leaf longitudinal end 128 is proximate second leaf longitudinal end 130.

FIG. 2C also illustrates cooking apparatus 100 in the closed configuration as viewed from a side comprising first leaf 104. As illustrated, in the closed configuration, cooking apparatus 100 has first height 132 as measured from a bottom aspect 111 of center section 102 to a bottom aspect 113 of first leaf 104. In the example illustrated, the bottom aspect 111 of center section 102 is opposite the bottom aspect 113 of first leaf 104. While not illustrated in this view, a bottom aspect 115 of second leaf 106 is also opposite a bottom aspect 111 of center section 102. As such, first height 132 is measured from the bottom aspect 111 of center section 102 to a bottom aspect (113, 115) of first leaf 104 or second leaf 106 in the closed configuration. In an aspect, cooking apparatus 100 comprises second height 134 that is measured from a bottom aspect 117 of storage unit 108 to a top aspect 109 of storage unit 108 that is opposite the bottom aspect 117. In the closed configuration, a top surface of storage unit 108 corresponding to the top aspect 109 of storage unit 108 can be coplanar with a bottom surface of each of first leaf 104 and second leaf 106 corresponding to respective bottom aspects (113, 115) of first leaf 104 and second leaf 106. As such, first height 132 may be substantially equal to second height 134. This configuration is beneficial for carrying and storage, as the closed configuration reduces a profile of cooking apparatus 100 relative to its open configuration.

Figure 3:
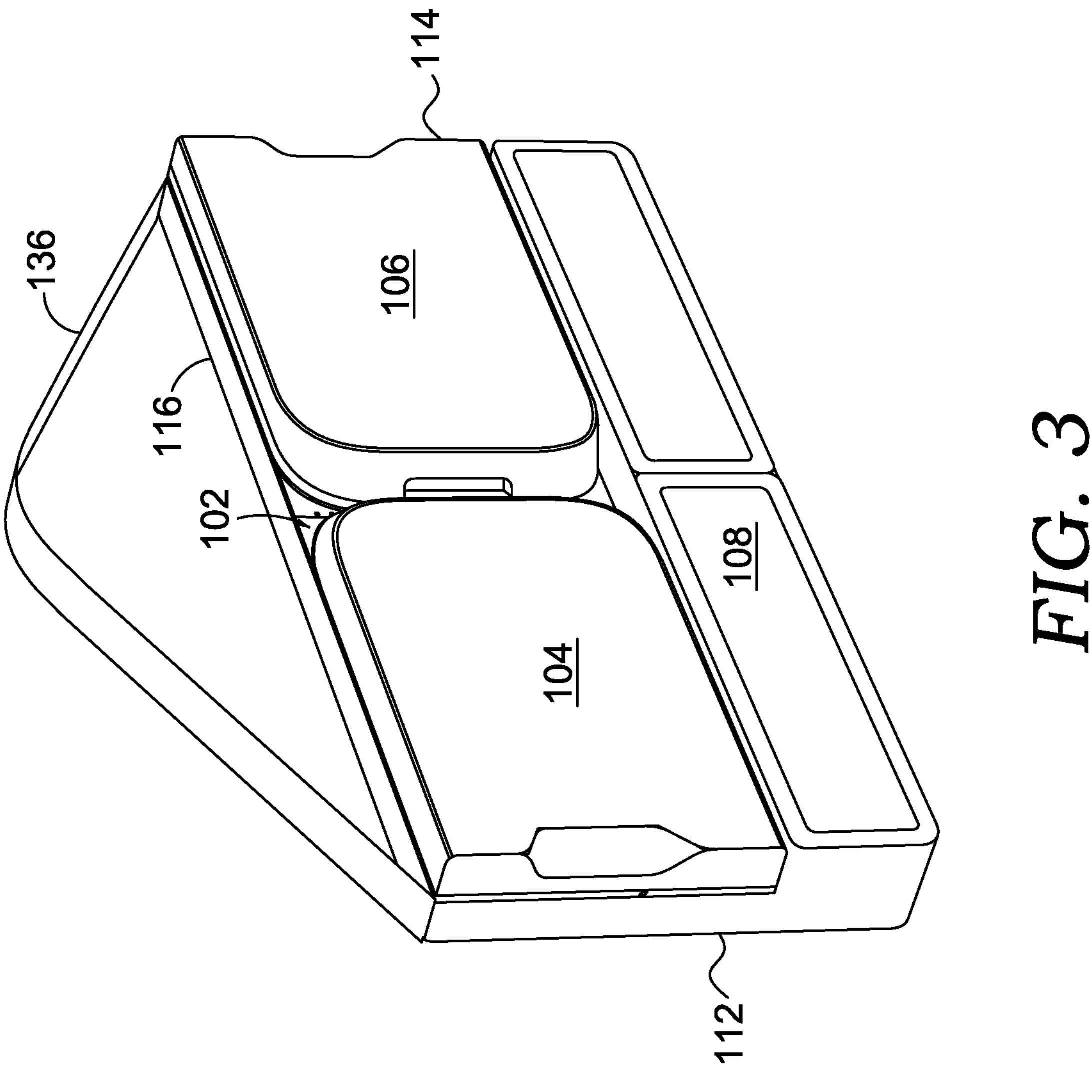
FIG. 3 illustrates the cooking apparatus of FIG. 1 further comprising a strap, in accordance with an aspect described herein.

With reference now to FIG. 3, an aspect of cooking apparatus 100 comprises strap 136. In general, a strap, such as strap 136, may be coupled to any one or more locations on cooking apparatus 100. In the aspect illustrated, strap 136 is coupled at a first location proximate first longitudinal side 112 of center section 102. It is coupled at a second location proximate second longitudinal side 114 of center section 102. In this example, each of the first location and the second location are at first lateral side 116 of center section 102. Strap 136 extends from the first location to the second location. Strap 136 may comprise any length, for instance, to be configured to carry by hand and or worn over the shoulder. In an aspect, strap 136 is of sufficient strength and length to aid in storing cooking apparatus 100 in a vehicle by, for example, securing the strap around a headrest or other securing device within the vehicle. Strap 136 may be made of a synthetic or natural material suitable for bearing a weight of cooking apparatus 100, examples of which include leather, nylon, cotton, polyester, polypropylene, and so forth.

Figure 4:
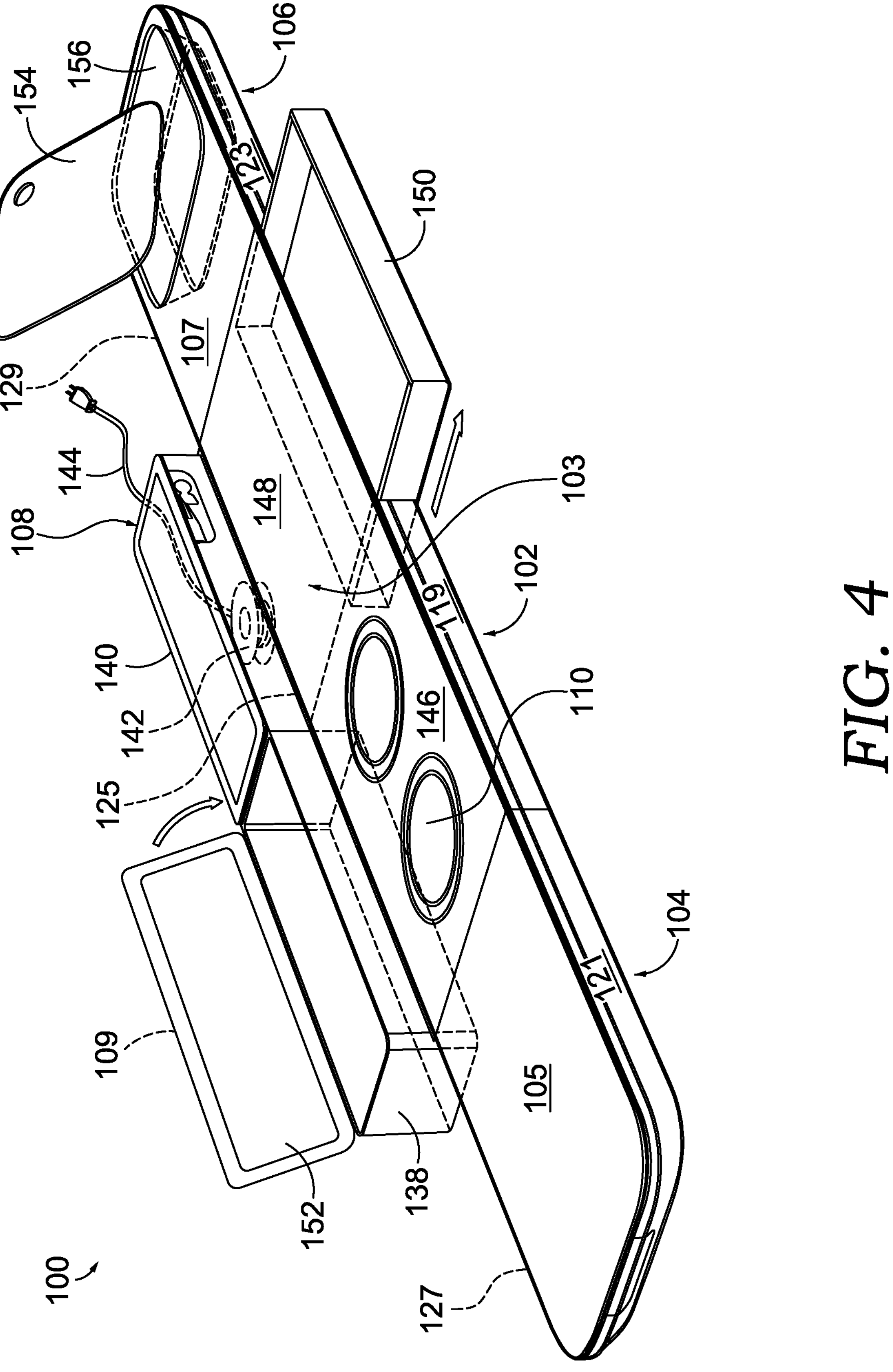
FIG. 4 illustrates the cooking apparatus of FIG. 1 with some example storage units in an open position, in accordance with an aspect described herein.

Turning now to FIG. 4, a front perspective view of cooking apparatus 100 of FIG. 1 is illustrated. Here, some example storage units are provided. Further, one example cooktop arrangement is also provided. The aspect illustrated by FIG. 4 is intended to be one example of the various applications and arrangements of the technology described herein. In general, a cooking apparatus may have one or more storage units that are located at any position or within areas of the cooking apparatus. The example provided by FIG. 4 and cooking apparatus 100 is intended to describe one example arrangement that is suitable for portability, storage, and use of cooking apparatus 100.

As illustrated in FIG. 4, cooking apparatus 100 comprises storage unit 108, which extends laterally away from at least a portion of a back aspect of cooking apparatus 100 (e.g., a portion of back aspect 125, 127, or 129). In general, storage unit 108 comprises a chamber that is accessible and can be used to store items, such as everyday cookware or food. In one aspect, storage unit 108 is formed of an insulative material, thereby allowing for temporary cool storage of items within it. Storage unit 108 can comprise any number of one or more storage bins. Each storage bin may be individually accessible to provide storage variability and separation between the various storage bins.

In the example illustrated, storage unit 108 comprises first storage unit bin 138 and second storage unit bin 140. Here, first storage unit bin 138 comprises a chamber accessible at a top aspect 109 of storage unit 108 by storage unit lid 152. Second storage unit bin 140 comprises retraction mechanism 142 for retracting cable 144 within second storage unit bin 140. Cable 144 can be a power cable suitable for coupling to a common power outlet or another power supply to provide power to cooking apparatus 100. This is beneficial where cooktop 110 is electrically operated, such as an induction cooktop, and generates heat using an electrical power source. In an aspect, storage unit 108 comprises a water tank. Any and all configurations in which storage unit 108 comprises one or more of a chamber, retractable cable, water tank, or any other item or mechanism are intended to be within the scope of this disclosure.

Continuing with FIG. 4, center section 102 comprises first subsection 146 and second subsection 148. Here, each of first subsection 146 and second subsection 148 comprises a portion of center section 102. Center section 102 may be divided into any one or more subsections, and each subsection may provide any one or more functionalities, such as comprising a cooktop, a storage unit, a cutting surface, and so forth, or any combination thereof.

In this example, first subsection 146 comprises cooktop 110 on a top aspect 103 of center section 102. Cooktop 110 may comprise a heating element. In an aspect, the heating element of cooktop 110 is an electric heating element. One example of cooktop 110 that comprises an electric heating element is an induction cooktop. While cooktop 110 is illustrated as having two heating elements, it will be understood that suitable cooktops may comprise one or more heating elements.

Continuing with this example, second subsection 148 is adjacent first subsection 146. Second subsection 148 comprises drawer 150 accessible at a front aspect 119 of center section 102. Drawer 150 comprises a storage unit where items or food may be stored. Second subsection 148 may comprise a cutting surface or other preparation surface.

Further, another utility that may be present in a cooking apparatus is illustrated at second leaf 106 of cooking apparatus 100. Here, second leaf 106 comprises cutting board 154. Cutting board 154 may comprise a material such as a wood, polymer, bamboo, glass, and so forth. In this example, cutting board 154 is positioned at a top aspect 107 of second leaf 106, and is illustrated as a separable unit. In some aspects, such as the one illustrated in FIG. 4, cutting board 154 is a separable unit, which includes at least partially separable (e.g., hingedly coupled), that provides access to storage bin 156. Here, storage bin 156 comprises a recessed chamber within second leaf 106 that is accessible via cutting board 154 at the top aspect 107. Like other storage units, storage bin 156 may be used to store items or food. In an aspect, storage bin 156 is coupled to a removable waste container, and access to the removable waste container is provided at the top aspect 107 of second leaf 106.

It is again noted that the storage bin arrangement, including those associated with storage unit 108, drawer 150, and storage bin 156, is one example, and it is intended other arrangements, including those with more or less storage units, are within the scope of the present disclosure. Likewise, the example cooktop arrangement comprising cooktop 110 is also an example, and other arrangements with more or less cooktops are intended to be within the scope of the present disclosure. For instance, one or more cooktops may be included on a top aspect (105, 107) of first leaf 104 or second leaf 106 in addition to, or in lieu of, one or more cooktops located at a top aspect 103 of center section 102.

Cooking apparatus, such as cooking apparatus 100, can be used in coordination with a vehicle. For instance, cooking apparatus 100 may be stored within a compartment of a vehicle for transport, and may rest at a location on the vehicle when in use, such as tailgate 202.

Figure 5:
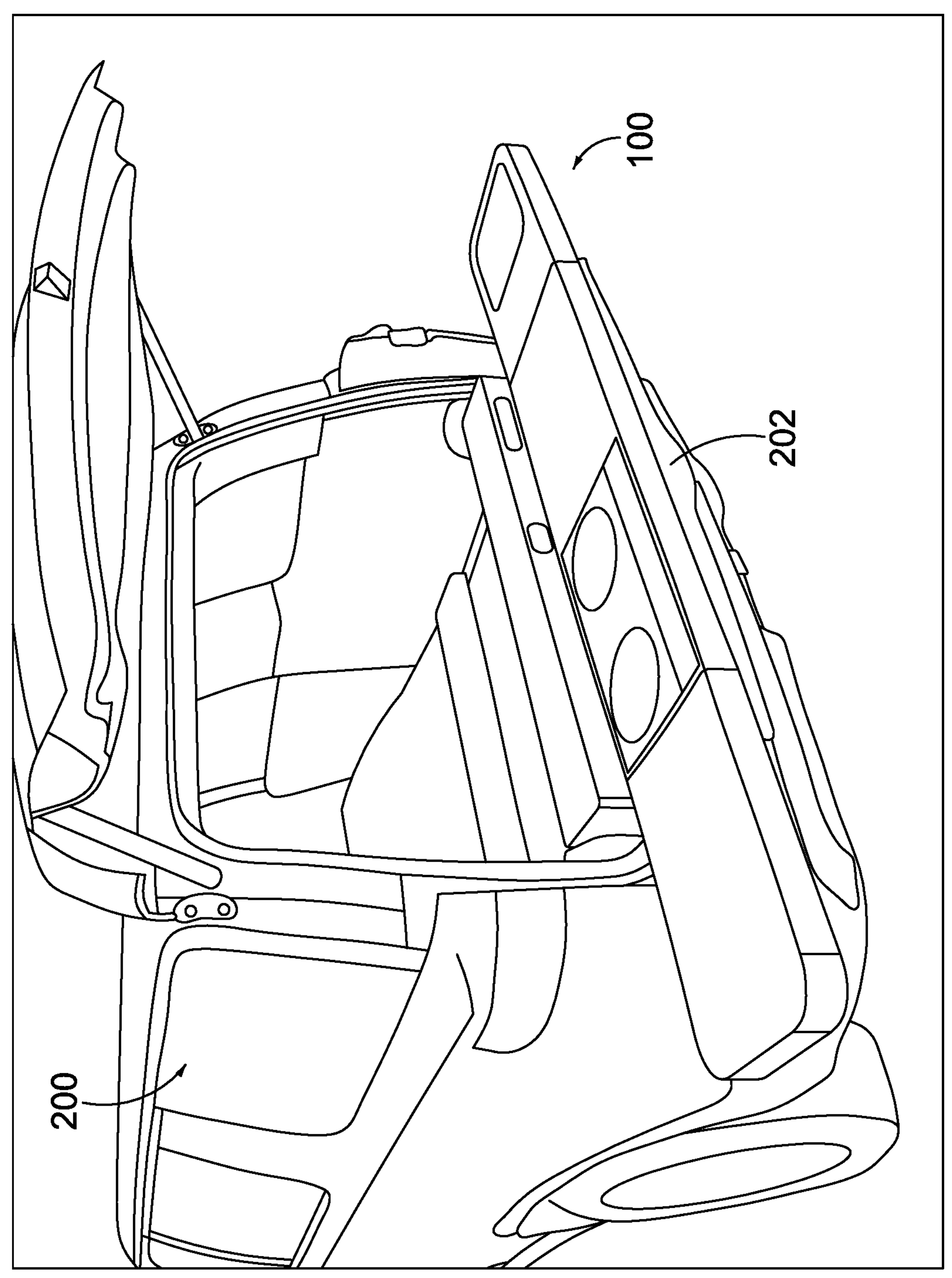
FIG. 5 illustrates the cooking apparatus of FIG. 1 in use with an example vehicle, in accordance with an aspect described herein.

Turning to the example illustrated in FIG. 5, cooking apparatus 100 is being used in coordination with vehicle 200. In general, vehicle 200 may be any powered vehicle, such as an electric or gas powered vehicle. In a specific example, vehicle 200 is an electric vehicle comprising a battery that provides an electric power source for cooking apparatus 100 in aspects where cooking apparatus 100 comprises an electric heating element, such as an induction cooktop. As an example, cooking apparatus 100 may be electrically coupled to the vehicle battery. One method of electrically coupling cooking apparatus 100 to the vehicle battery is via a power cable, such as cable 144 previously described. Optionally, cooking apparatus 100 comprises a battery that is charged via an electrical coupling to vehicle 200, e.g., charged through a battery of vehicle 200 or charged via a charging unit or station providing an external electrical power source accessed by vehicle 200.

Figure 6:
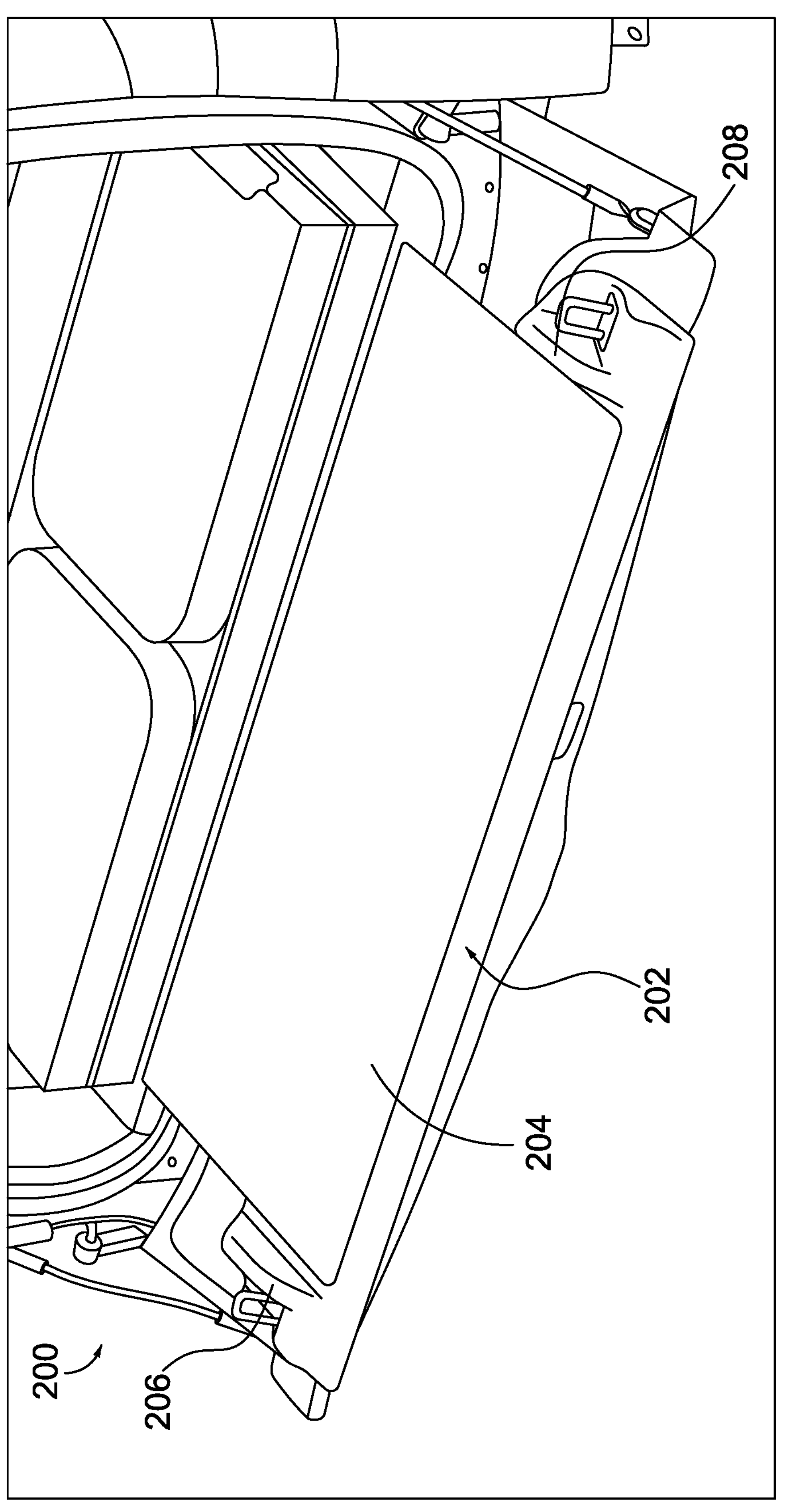
FIG. 6 illustrates an example tailgate the vehicle of FIG. 5, in accordance with an aspect described herein.

FIG. 6 illustrates a perspective view of tailgate 202 of vehicle 200. Throughout the description, reference is made to the example illustrated by vehicle 200 and tailgate 202 when used in coordination with cooking apparatus 100. However, it is intended that vehicle 200 and tailgate 202 provide one example suitable for implementing the technology. However, it will be understood that this and other arrangements may be used. For instance, cooking apparatuses may be used with other vehicle models, such as the tailgate of a truck or a dropgate of an SUV (sport utility vehicle). In aspects, a cooking apparatus is a freestanding apparatus or rests on another object separable from the vehicle, and the cooking apparatus is in wired or wireless communication with the vehicle.

Having this in mind, as provided in the example illustrated by FIG. 6, tailgate 202 comprises surface 204 on which cooking apparatus 100 may rest. In an aspect, surface 204 comprises at least a portion that is planar, e.g., provides a flat surface on which cooking apparatus 100 can rest.

In an aspect, tailgate 202 comprises one or more vehicle engagement points. Here, the example comprises first vehicle engagement point 206 and second vehicle engagement point 208. In general, a vehicle engagement point is a location on the vehicle at which a cooking apparatus mates via a cooking apparatus engagement point, as will be further illustrated. As illustrated in FIG. 6, first vehicle engagement point 206 and second vehicle engagement point 208 each extend upward and away from surface 204. In this example, first vehicle engagement point 206 and second vehicle engagement point 208 are an integral extension of a material that forms at least part of tailgate 202. In other aspects, one or more vehicle engagement points may be separate components coupled to a location of tailgate 202 or another aspect of vehicle 200.

Figure 7:
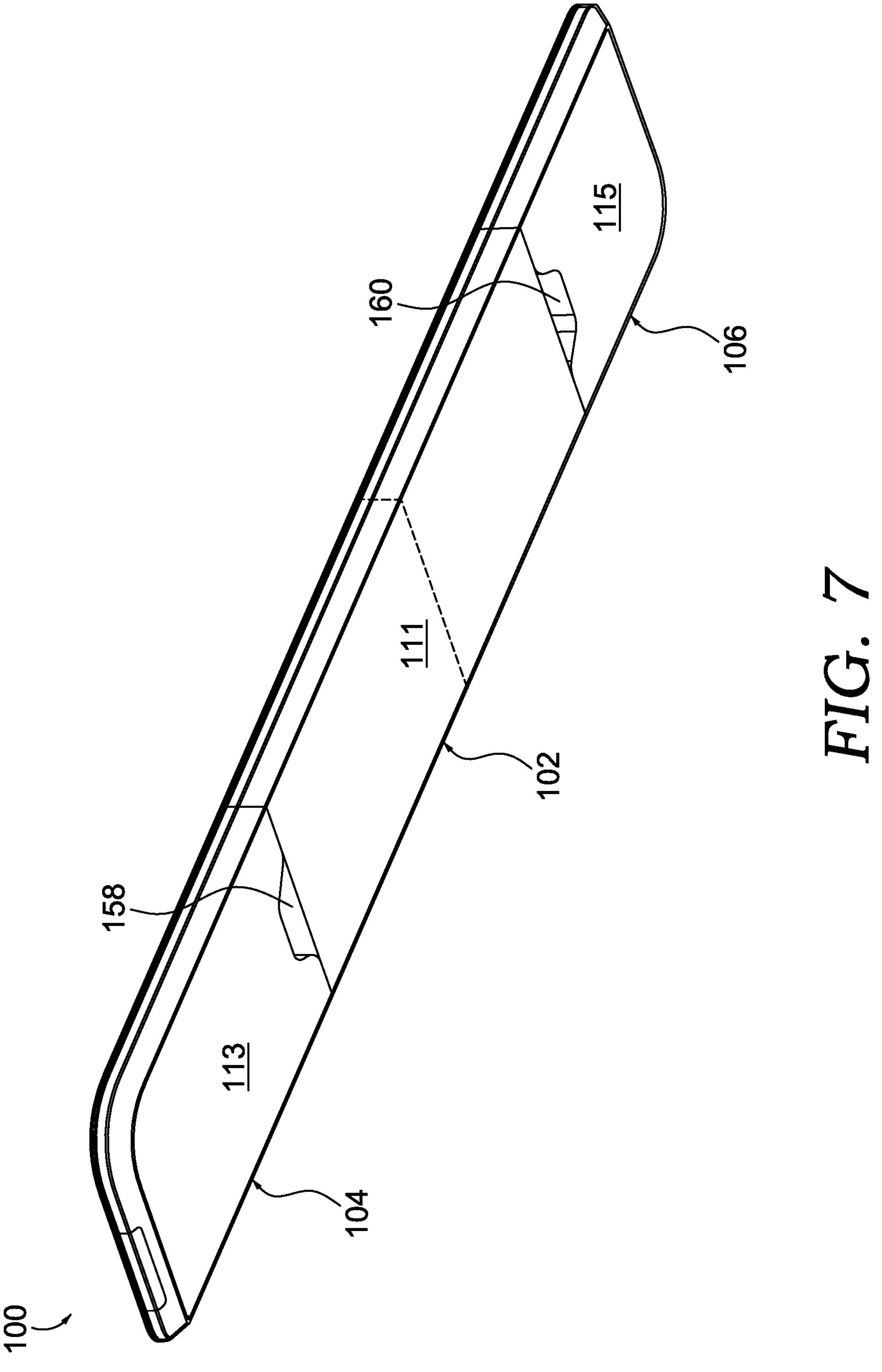
FIG. 7 illustrates a bottom perspective view of the cooking apparatus of FIG. 1, in accordance with an aspect described herein.

FIG. 7 illustrates a bottom perspective view of cooking apparatus 100. Cooking apparatus 100 may comprises one or more cooking apparatus engagement points, which as noted, can be configured to mate with one or more vehicle engagement points. In this example aspect, cooking apparatus 100 comprises first cooking apparatus engagement point 158 located on a bottom aspect 113 of first leaf 104. Cooking apparatus 100 further comprises second cooking apparatus engagement point 160 located on a bottom aspect 115 of second leaf 106. It will be understood that cooking apparatus engagement points may be positioned at any location on a cooking apparatus such that each of the one or more cooking apparatus engagement points are configured to mate with each of the one or more vehicle engagement points. In this example, each of first cooking apparatus engagement point 158 and second cooking apparatus engagement point 160 are recessed areas configured to respectively mate with first vehicle engagement point 206 and second vehicle engagement point 208 of FIG. 6. In general, a cooking apparatus engagement point may take the form of an area shaped to correspond to a vehicle engagement point, while in other embodiments, a cooking apparatus engagement point may take the form of an integral or separate component, such as a hook anchor or locking mechanism that couples to a vehicle engagement point.

Figure 8:
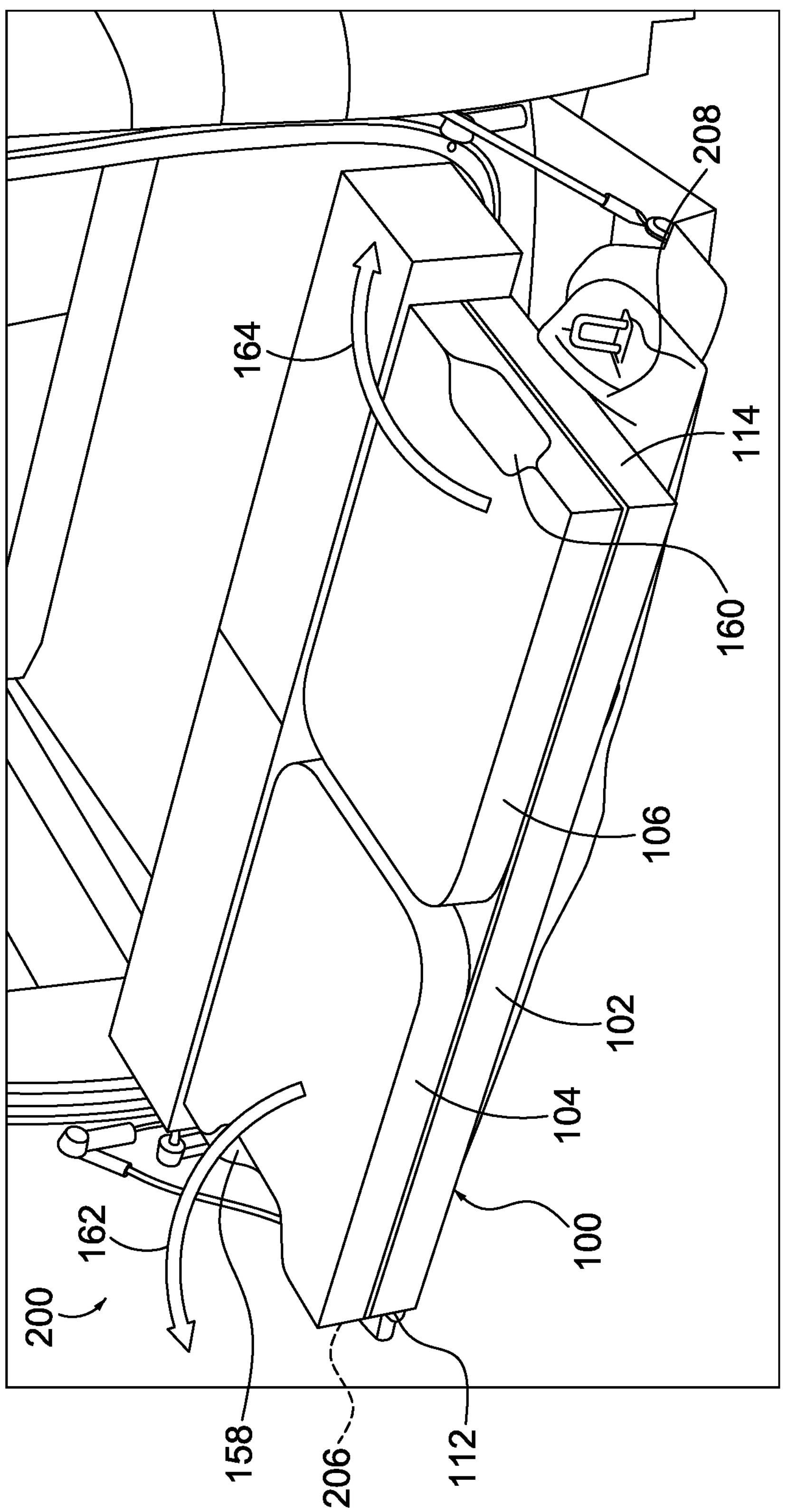
FIG. 8 illustrates the cooking apparatus of FIG. 1 employed on the tailgate of the vehicle of FIG. 5, in accordance with an aspect described herein.

FIG. 8 illustrates a perspective view of vehicle 200 comprising cooking apparatus 100 resting on a surface of tailgate 202. Here, cooking apparatus 100 is in the closed configuration. As illustrated, a distance separating first vehicle engagement point 206 and second vehicle engagement point 208 can be about equal to a longitudinal distance over which center section 102 extends between first longitudinal side 112 and second longitudinal side 114. In this way, cooking apparatus 100 is at least partially secured longitudinally to reduce shifting of cooking apparatus 100 along the longitudinal direction when in use.

Also illustrated in the aspect of FIG. 8 are first cooking apparatus engagement point 158 and second cooking apparatus engagement point 160. When cooking apparatus 100 is transitioned to the open configuration, illustrated by folding first leaf 104 in the direction indicated by arrow 162 and folding second leaf 106 in the direction indicated by arrow 164, first cooking apparatus engagement point 158 mates with first vehicle engagement point 206 and second cooking apparatus engagement point 160 mates with second vehicle engagement point 208. In doing so, first vehicle engagement point 206 is inserted at least partially into the recess within first leaf 104 that forms first cooking apparatus engagement point 158, while second vehicle engagement point 208 is inserted at least partially within the recess of second leaf 106 that forms second cooking apparatus engagement point 160. This aids to reduce movement by cooking apparatus 100 in the lateral direction when in use.

Figure 9:
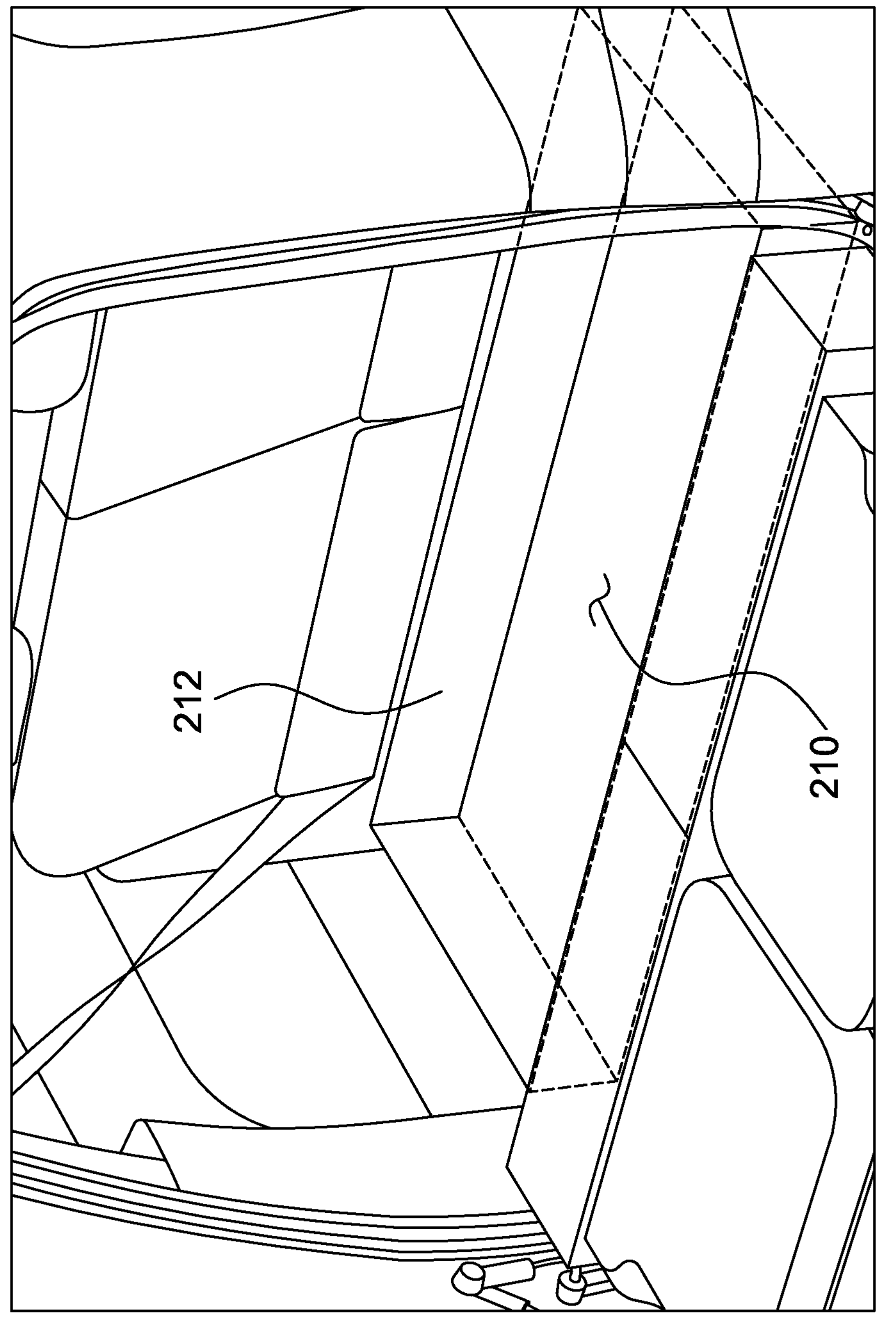
FIG. 9 illustrates an example storage compartment within the vehicle of FIG. 5, in accordance with an aspect described herein.

Turning now to FIG. 9, a perspective view of a rear area within vehicle 200 is illustrated. Vehicle 200 comprises storage compartment 210 located in a rear cargo area floor of vehicle 200. While illustrated at the rear cargo area floor, it will be appreciated that vehicle 200 may comprises one or more storage compartments at any suitable location, and as such, storage compartment 210 is intended to provide one example aspect usable with the technology. In this example, storage compartment 210 is accessible at a rear opening of vehicle 200. In other aspects, storage compartments may be accessed through vehicle doors or storage compartment doors provided on a body of the vehicle. For instance, in a particular aspect, a storage compartment is positioned between a truck bed and truck cab of a truck, and the storage compartment door is provided on a side of the outer body of the truck, thus making the storage compartment and contents within it accessible from the outside of the truck.

Continuing with FIG. 9, storage compartment 210 is at least partially recessed within the rear cargo area floor, thereby at least partially forming storage compartment profile 212. Storage compartment profile 212 at least partially delineates storage compartment 210, and thus, at least partially defines a storage compartment volume of storage compartment 210. In general, storage compartment profile 212 is shaped to correspond to a cooking apparatus profile in the closed configuration. In a particular aspect, a height of a storage compartment profile that at least partially defines the storage compartment volume is about equal to a height of the cooking apparatus. For instance, a height of storage compartment profile 212 may be about equal to first height 132 and second height 134 (illustrated in FIG. 2C) of cooking apparatus 100. In this way, cooking apparatus 100 nests flush within storage compartment 210 for transport by vehicle 200. In an aspect, a longitudinal length of storage compartment profile 212 is about equal to a longitudinal length of center section 102 as measured from first longitudinal side 112 to second longitudinal side 114.

Figure 10:
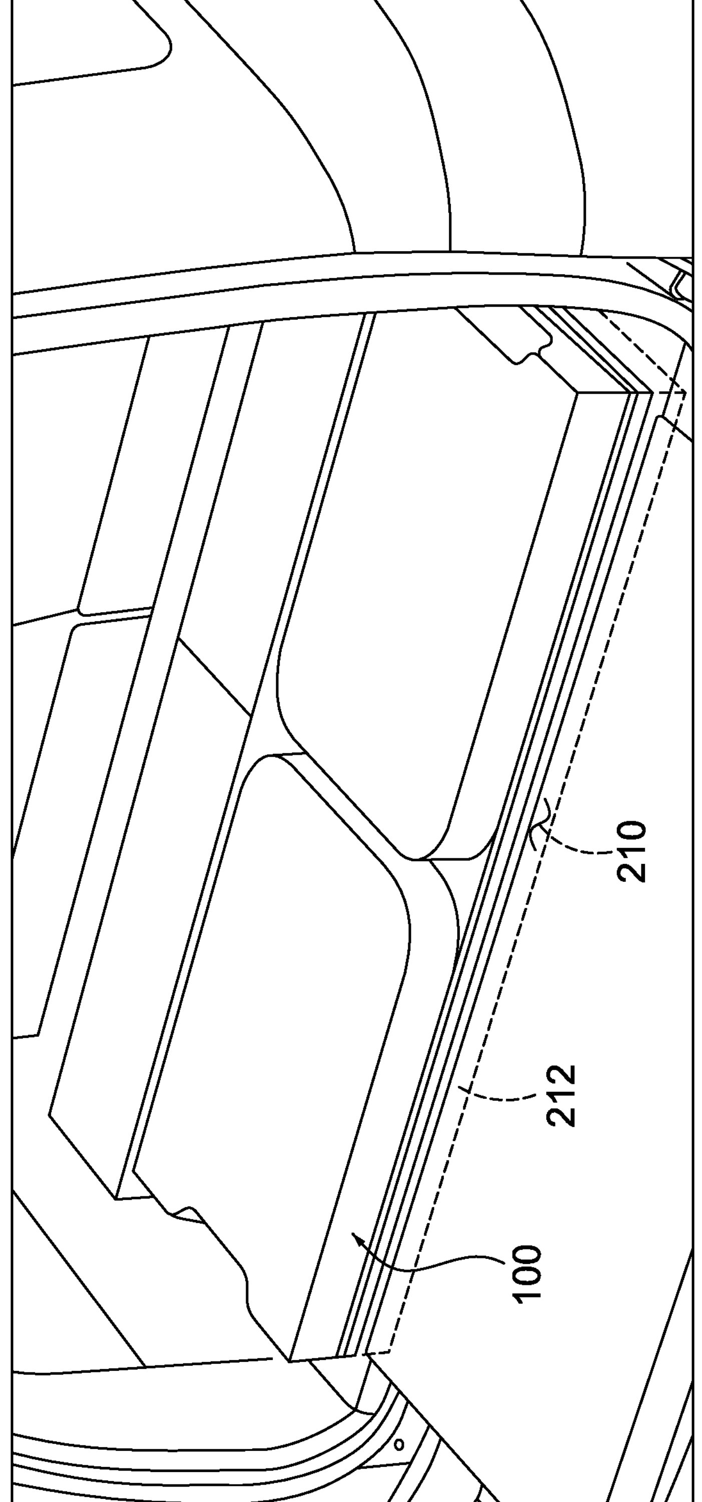
FIG. 10 illustrates the cooking apparatus of FIG. 1 in the closed configuration and stowed within the storage compartment of FIG. 9, in accordance with an aspect described herein.

FIG. 10 illustrates the same view as FIG. 9, now comprising cooking apparatus 100 nested within storage compartment 210.

Figure 11:
FIG. 11 is a flow diagram of an example method for stowing the cooking apparatus of FIG. 1 within the storage compartment of FIG. 9, in accordance with an aspect described herein.

FIG. 11 is provided to illustrate and described an example method 300 for stowing a cooking apparatus, such as cooking apparatus 100, within a storage compartment of a vehicle, such as storage compartment 210 of vehicle 200. At block 302, a cooking apparatus is transitioned from an open configuration to a closed configuration. Continuing with the example provided by cooking apparatus 100 and referring briefly to FIGS. 2A and 2B, cooking apparatus 100 can be transitioned from the open configuration to the closed configuration illustrated in FIG. 2B by folding first leaf 104 about center section 102 in the direction indicated by directional arrow 124, and by folding second leaf 106 about center section 102 in the direction indicated by directional arrow 126.

In an aspect, the process of folding first leaf 104 and second leaf 106 disengages a vehicle engagement point from a cooking apparatus engagement point. For example, by transitioning cooking apparatus 100 to the closed configuration, as illustrated in FIG. 8, first vehicle engagement point 206 disengages from first cooking apparatus engagement point 158, while second vehicle engagement point 208 disengages from second cooking apparatus engagement point 160. In another aspect, the vehicle engagement point is mated with the cooking apparatus engagement point when the cooking apparatus is in an open configuration, and the cooking apparatus requires disengaging the vehicle engagement point from the cooking apparatus engagement point prior to transitioning it from the open configuration to the closed configuration. For instance, this may be the case where the vehicle hooks to the cooking apparatus at a hook anchor or is secured via another locking mechanism.

In an aspect, method 300 further comprises closing a storage unit of the cooking apparatus. With reference briefly now to FIG. 4, method 300 may comprise closing storage unit lid 152 or drawer 150, or placing cutting board 154 onto an opening of storage bin 156. Another aspect, of method 300 comprises retracting cable 144 within second storage unit bin 140.

At block 304, the cooking apparatus is nested within the storage compartment of the vehicle. To do so, the cooking apparatus may be placed at least partially within the storage compartment volume of the storage compartment when the cooking apparatus is in the closed configuration. In doing so, the cooking apparatus profile is at least partially positioned within the storage compartment profile. Referring to FIGS. 9 and 10, an example is illustrated by cooking apparatus 100, where cooking apparatus 100 is positioned within storage compartment 210 when in the closed configuration.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

In addition, words such as "a" and "an," unless otherwise indicated to the contrary, include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

Terms, such as "having," "including," or the like, and derivatives thereof, are intended to have the same broad meaning as "comprising," unless otherwise expressly indicated.

The word "accessing," and derivatives thereof, comprises "receiving," "referencing," "retrieving," and the like. Further, the word "communicating" has the same broad meaning as the word "receiving" or "transmitting" facilitated by software or hardware-based buses, receivers, or transmitters using communication media described herein, unless otherwise expressly indicated.

Unless explicitly indicated otherwise, ranges are intended to provide example embodiments that are suitable for some aspects and implementations. They are not intended to exclude other embodiments of the technology having values falling outside of the given ranges.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

What is claimed is:

1. An apparatus, comprising:

a cooktop disposed on a top, upward-facing surface of the apparatus;

one or more foldable leaves; and a cooking apparatus engagement point, wherein:

the cooking apparatus engagement point is disposed on a bottom surface of the apparatus opposite the top, upward-facing surface of the apparatus;

the bottom surface of the apparatus is configured to rest on top of an uppermost, upward-facing surface of a tailgate of a vehicle when the tailgate is in an open position; and the cooking apparatus engagement point is configured to mate with a vehicle engagement point projecting upward from the uppermost, upward-facing surface of the tailgate such that the apparatus is secured to the tailgate when the tailgate is in the open position.

2. The apparatus of claim 1, wherein the cooktop is an induction cooktop.

3. The apparatus of claim 1, wherein:

the apparatus further includes a center section comprising the cooktop;

the one or more foldable leaves are configured to fold for stowing the apparatus in a storage compartment of the vehicle;

the one or more foldable leaves include:

a first leaf foldable at a first side of the center section; and a second leaf foldable at a second side of the center section;

the first leaf comprises a first leaf top aspect opposite a first leaf bottom aspect;

the second leaf comprises a second leaf top aspect opposite a second leaf bottom aspect; and the center section comprises a center section top aspect opposite a center section bottom aspect; and folding the first leaf and the second leaf transitions the apparatus between an open configuration and a closed configuration.

4. The apparatus of claim 3, wherein the second leaf top aspect and the center section top aspect are coplanar in the open configuration.

5. The apparatus of claim 3, wherein the first leaf is foldable at a first longitudinal side of the center section and the second leaf is foldable at a second longitudinal side of the center section, and the apparatus further comprises a storage unit extending laterally from the center section at a first lateral side extending between the first longitudinal side and the second longitudinal side.

6. The apparatus of claim 5, wherein the first leaf top aspect and the second leaf top aspect each face the center section top aspect in the closed configuration, and wherein, in the closed configuration, a first height is measured from the center section bottom aspect to the first leaf bottom aspect, and wherein the storage unit has a second height as measured from a storage unit bottom aspect to a storage unit top aspect, the first height is substantially the same as the second height.

7. The apparatus of claim 3, wherein;

the center section comprises a first subsection and a second subsection;

the first subsection comprises the cooktop disposed at the center section top aspect; and the second subsection comprises a drawer accessible at a center section front aspect corresponding to a lateral side of the center section.

8. The apparatus of claim 3, further comprising a strap, wherein:

the strap is coupled to the center section at a first location proximate a first longitudinal side of the center section; and the strap is coupled to the center section at a second location proximate a second longitudinal side of the center section.

9. A system comprising:

a vehicle, comprising:

a storage compartment having a storage compartment profile; and a vehicle engagement point projecting upward from an uppermost, upward-facing surface of a tailgate of the vehicle when the tailgate is in an open position; and a cooking apparatus, comprising:

a cooktop disposed on a top, upward-facing surface of the apparatus;

one or more foldable leaves; and a cooking apparatus engagement point, wherein:

the cooking apparatus engagement point is disposed on a bottom surface of the cooking apparatus opposite the top, upward-facing surface of the cooking apparatus;

the bottom surface of the cooking apparatus is configured to rest on top of the uppermost, upward-facing surface of the tailgate of the vehicle when the tailgate is in the open position; and the cooking apparatus engagement point is configured to mate with the vehicle engagement point such that the cooking apparatus is secured to the tailgate.

10. The system of claim 9, wherein:

the cooking apparatus further includes a center section comprising the cooktop;

the center section comprises a first longitudinal side opposite a second longitudinal side and a first lateral side opposite a second lateral side;

the one or more foldable leaves are configured to fold for stowing the cooking apparatus in a storage compartment of the vehicle; and the one or more foldable leaves include:

a first leaf foldable with the first longitudinal side of the center section; and a second leaf foldable with the second longitudinal side of the center section.

11. A cooking apparatus, comprising:

a cooktop disposed on a first surface of the apparatus;

a center section;

a first leaf foldable at a first side of the center section; and one or more cooking apparatus engagement points disposed on a second surface of the apparatus opposite the first surface of the apparatus, wherein the one or more cooking apparatus engagement points are configured to mate with one or more vehicle engagement points that extend upward and away from a surface of a tailgate on which the apparatus is configured to rest.

12. The cooking apparatus of claim 11, further comprising a second leaf foldable at a second side of the center section, wherein:

the first leaf and the second leaf each include the first surface and the second surface;

a first cooking apparatus engagement point of the one or more cooking apparatus engagement points is disposed on the second surface of the first leaf and is configured to mate with a first vehicle engagement point of the one or more vehicle engagement points; and a second cooking apparatus engagement point of the one or more cooking apparatus engagement points is disposed on the second surface of the second leaf and is configured to mate with a second vehicle engagement point of the one or more vehicle engagement points.

13. The system of claim 10, wherein the second leaf comprises a removable cutting board on a top aspect of the second leaf.

14. The system of claim 10, wherein:

folding the first leaf and the second leaf transitions the cooking apparatus between an open configuration and a closed configuration;

the first leaf comprises a first leaf top aspect opposite a first leaf bottom aspect;

the second leaf comprises a second leaf top aspect opposite a second leaf bottom aspect; and the center section comprises a center section top aspect opposite a center section bottom aspect; and the first leaf top aspect and the second leaf top aspect each face the center section top aspect in the closed configuration.

15. The system of claim 14, wherein the first leaf top aspect, the second leaf top aspect, and the center section top aspect are coplanar in the open configuration.

16. The system of claim 14, wherein the cooking apparatus further comprises a storage unit extending laterally from the center section at the first lateral side.

17. The system of claim 16, wherein, in the closed configuration, a first height, measured from the center section bottom aspect to the first leaf bottom aspect, is substantially the same as a second height measured from a storage unit bottom aspect to a storage unit top aspect.

18. The system of claim 10, wherein the center section comprises a first subsection and a second subsection, the first subsection comprising the cooktop disposed at a center section top aspect, and the second subsection comprising a drawer accessible at a center section front aspect corresponding to the second lateral side of the center section.

19. The system of claim 10, wherein the cooking apparatus further comprises a strap, the strap coupled to the center section at a first location proximate the first longitudinal side, and the strap coupled to the center section at a second location proximate the second longitudinal side.

* * * * *